United States Patent Office 2,871,094
Patented Jan. 27, 1959

2,871,094

PURIFICATION OF TITANIUM TETRACHLORIDE WITH COPPER

Alexandre R. Tarsey, Las Vegas, Nev., and William D. Guthrie, Fayetteville, Ark., assignors to Titanium Metals Corporation of America, New York, N. Y., a corporation of Pennsylvania No Drawing. Application January 26, 1956
Serial No. 561,678

7 Claims. (Cl. 23—87)

This invention relates to the purification of titanium tetrachloride, and more particularly to a simple and economical process for purifying the so-called "crude" titanium tetrachloride to produce a pure grade adapted for the manufacture of titanium metal, pigments and compounds.

Crude titanium tetrachloride is generally produced by chlorination of titaniferous iron ores or rutile, and is invariably contaminated by various impurities which are also chlorinated, or are carried over with the titanium tetrachloride from the chlorination furnace. The impurities may include chlorides of metallic impurities in the ore, dust and other foreign materials suspended in the titanium tetrachloride vapor stream, as well as other impurity materials picked up during processing. Many of these impurities may be separated by distillation processes. However, some compounds, particularly those of vanadium, because of the lack of appreciable differences in boiling points between these impurities and titanium tetrachloride, cannot be readily so separated. A chemical treatment is, therefore, often employed to precipitate such compounds as precipitates which may be thereafter more readily removed and the titanium tetrachloride thereby completely refined. The precise action of these chemical treating agents is not known. Agents heretofore proposed have included metallic copper, alone or in combination with metallic salts, as well as oils, carbonaceous organic compounds and reactive sulfides. Copper has been found to be a satisfactory treating agent; however, as heretofore employed, has proven to be uneconomical and inefficient due to the fact that it becomes fouled with precipitated impurities, and treatment with an acid solution is necessary to recondition its surface for continued purification action. As is the case with other treating agents, substantial amounts of copper are used, dissolved and lost.

An object of this invention is therefore to provide an improved method for the purification of titanium tetrachloride. A further object of this invention is to provide a rapid and economical method for purification of titanium tetrachloride in which the chemical treating agent is recycled and reused. A still further object of this invention is to provide a cyclic method for purification of titanium tetrachloride employing a copper treating agent, which is recycled and reused with little loss and at low cost. These and other objects of this invention will become apparent from the following more complete description thereof.

In its broadest aspects, this invention contemplates purifying crude titanium tetrachloride by contact with metallic copper, which has been chemically deposited or plated onto a ferrous metal surface. Subdivided sections or pieces of appropriate size of iron may be copper plated and employed, and the crude titanium tetrachloride is brought into contact with these pieces at an elevated temperature, preferably about or above the boiling point of titanium tetrachloride. Contact is maintained until undesirable impurities have been converted to insoluble compounds. As the purification proceeds, the copper becomes fouled by reason of precipitation of impurity compounds thereon. Periodically, when, by observation or analysis of the purified product, it is evident that the copper is fouled or used up to the extent that it no longer acts effectively, the operation is stopped and titanium tetrachloride drained from the copper-plated iron pieces. A dilute acid wash solution is employed to clean the packing surfaces; preferably the acid wash solution is formed in situ by simply washing the pieces with water since reaction of water with residual $TiCl_4$ will produce an efficient hydrochloric acid wash solution. The washing may be carried on until it is evident that the pieces are reasonably clean, and it will be found at this stage that the surfaces of the iron packing is in advantageous condition for replating. The wash solution is not discarded since it contains copper values removed from the copper-plated iron pieces. It is clarified, adjusted as to copper content and pH value, and is then passed back through the iron pieces where its copper content is chemically replated onto the iron. The copper content is thereby recovered and the iron pieces are provided with a freshly deposited coating of metallic copper ready for treatment of additional crude $TiCl_4$.

Contact of titanium tetrachloride with the copper-plated iron pieces according to this invention is preferably carried out in a packed tower or column. An adjacent still may be employed for vaporization of titanium tetrachloride which is fed to the column where it is refluxed; thus affording good contact and elevated temperature for efficient precipitation of impurities. If desired, other types of apparatus may be employed to accomplish similar results; alternatively the titanium tetrachloride may be contacted in the liquid state with copper-plated iron surfaces in any suitable apparatus. Elevated temperatures increase the reactivity, and it is therefore preferred to carry out the contacting step at temperatures approximating the boiling point of titanium tetrachloride in order to obtain the advantages of faster and more efficient purification.

The copper-plated ferrous metal treating agent is in such form as to provide a large surface area for reaction with titanium tetrachloride. The tower, for example, may be packed originally with scrap iron in the form of borings, turnings, shavings, or any other convenient pieces which will provide a large surface area and adequate porosity in the packing. Special tower packing shapes such as rings or saddles may also be employed to provide a more nearly theoretically ideal packing arrangement. The tower originally packed with the iron material is then treated with a copper solution in order to chemically deposit the copper plating on the surface of the iron. The copper solution employed for this purpose may consist of a solution of copper chloride, nitrate, sulfate, or of other suitable soluble copper compound. It is preferred, however, to employ a copper chloride solution. The original plating solution should contain dissolved copper in the amounts ranging from 1 gram per litter to 20 grams per liter, and should have a pH between 2 and 6, preferably about 4. If the solution has a pH of less than 2, corrosive effects on the packing material and associated equipment will be severe and if the pH is greater than 6, copper compounds will tend to precipitate out of the solution. The copper solution is passed slowly through the tower, preferably by upward percolation to insure complete contact with all the iron surfaces. Preferably the copper solution is circulated through the tower until the recycled liquid shows a complete, or almost complete, stripping of its copper content. Since the amount of copper precipitation per square foot of iron surface area should, for best results, amount to about between 2 to 5 grams, the total volume of copper solution employed in the initial plating operation should be related to this factor so that efficient utilization of substantially all the copper in solution is obtained.

After plating, the tower packing mass is washed with water to remove residual acid and solution, and is then dried, conveniently, by passage therethrough of a hot, non-oxidizing, and non-reactive gas. Since the freshly deposited copper is extremely reactive, a non-oxidizing gas is used to reduce as much as possible oxidation of the copper surfaces which reduce their efficiency for reaction with titanium tetrachloride impurities. Hot flue gas, which is essentially reducing, will be found efficient and economical as a drying gas.

Titanium tetrachloride vapor is then admitted to the column, refluxed and passed through to precipitate and remove impurities such as vanadium oxychloride. The rate of reflux and throughput may vary considerably, and this may be adjusted to provide an output stream of substantially pure titanium tetrachloride. A clear, water-white product obtained from the output of the packed tower generally indicates absence of vanadium compounds and may be taken as an indication of purity. Chemical tests for vanadium in the purified product may also be employed.

After a period of operation, chemical reaction with impurities and fouling of the packing surfaces affect the copper-plated iron to the point where its purification action will no longer be efficient. This will become apparent from examination of the impurity of the product stream from the top of the tower. When it is apparent that desired purity is not being obtained, the titanium tetrachloride vapor flow is stopped and distillation is shut down. The tower packing which, due to refluxing and passage therethrough of titanium tetrachloride, will be wet with this compound is then preferably drained to recover as much as possible of the titanium tetrachloride from the tower. After draining, the tower is washed to remove the precipitated impurities and spent copper treating agent. It is preferred, according to this invention, to wash the fouled treating agent with water, which on contacting the residual titanium tetrachloride in the tower and adhering to the packing surfaces causes hydrolysis to produce titanium oxide compounds and a dilute hydrochloric acid solution. The hydrochloric acid, which now converts the added water into an efficient dilute hydrochloric acid wash solution, quickly and efficiently cleans the surfaces of the packing. Preferably the wash solution is passed upwardly through the tower and may be recycled until efficient removal of solid materials is obtained. While water is a preferred wash solution, for reasons of economy and convenience, it will be obvious to those skilled in the art that a dilute acid solution may be equivalently employed. If the amount of residual $TiCl_4$ in the tower is insufficient, for some reason, to provide sufficient acid strength on hydrolysis to efficiently clean the tower packing, a dilute solution of hydrochloric acid, for example, may be used as the wash. Or if a dilute acid solution is available, such as wash solution from a previous washing operation, this may be more desirable to use as a wash than fresh water.

During purification, the metallic copper becomes to an appreciable extent, apparently converted into complex compounds, reacting with various impurities in the crude $TiCl_4$. The acid action of the wash dissolves and or otherwise removes these; but since a major part of the copper has thereby been removed from the iron surfaces, the treating agent is not rejuvenated by the action of the acid and replating with copper is necessary to restore it to its former effectiveness.

The used wash solution contains metallic copper, iron salts, copper chlorides, titanium salts, vanadium compounds, and various other impurities in the form of sludge and suspended particles. The sludge may be separated from the supernatant liquor and this liquor adjusted for copper content and pH and used for replating the iron packing in the tower. The sludge, however, will contain some amount of metallic copper which could and can be recovered by a preferred procedure in which the solution is oxidized, preferably with a small amount of nitric acid, to dissolve any metallic copper which may be present. However, the solution as used for plating should be reducing in character, and it has also been found that when reduced titanium chlorides, such as titanium dichloride and titanium trichloride, are present in small amounts in the plating solution a substantially improved and more firmly adherent copper deposit is obtained. Since titanium chloride salts will be present in the wash solution, the color thereof will indicate its reducing or oxidizing character; the typical violet color of reduced titanium chlorides will indicate a reducing condition and the normal blue imparted by the presence of copper will show if no reduced titanium chlorides are present and the solution is oxidizing. Therefore, to obtain the copper in solution and also the preferred reducing conditions, a portion of the original liquor, amounting to between 3 and 10%, may be separated and reserved prior to oxidizing the remainder, including the sludge with nitric acid. After oxidation, the reserved portion, which will be dark violet or purple, is slowly added again to the oxidized solution in amount to just bring back the violet color indicating the presence of reduced titanium chlorides. Obviously the adjustment back to reducing condition must not be carried far enough to reprecipitate copper out of solution again. The insoluble solids and sludge are then separated by settling, centrifugation, filtration or other equivalent procedure. The clarified solution is tested for copper content according to well-known analytical methods and, if necessary, the copper content adjusted to between 1 gram per liter and 20 grams per liter, preferably by addition of copper chloride. The pH of the solution is adjusted to a pH of between 2 and 6 by addition of alkali, such as a hydroxide or carbonate of an alkali or alkaline earth metal or any other salt or compound capable of neutralizing the excess acid.

The clarified wash solution, now adjusted as to copper content and pH, is led back through the packing in the tower to replate the iron packing material and to recover its copper content. The solution is passed through the tower, preferably continuously, and by upward flow in which the tower packing is immersed in the solution, until its copper content has been substantially all plated on the surface of the tower packing. Thus, it will be seen that the copper used for purification of the titanium tetrachloride passed through the tower is recovered and recycled, and the mass of copper-plated particles in the tower is reconstituted for reaction with additional crude titanium tetrachloride. After plating, the tower packing material is washed with water to remove residual acid and solution, and is then dried, preferably by passage therethrough by a hot non-oxidizing gas, and the tower is then ready for another cycle of titanium tetrachloride purification as previously described. The cycle may be repeated over and over again, the only usual make-up required being the amount of copper added to the wash solution to bring its copper content up to desired plating concentration, and occasional replacement of ferrous metal packing pieces.

The following example will illustrate an embodiment of the practice of this invention.

*Example I*

A vertical ceramic tube 3″ by 48″ was packed with scrap iron sheet in small pieces about ¾ by 1 inch. A solution containing 13 grams per liter of copper chloride (equivalent to 5 grams of Cu per liter), and of pH 5 was passed through the packed tube and as a result the iron particles become plated with metallic copper. The solution was passed upwardly through the column until substantially all its copper content had been plated, amounting to about 3 grams of metallic copper plated per square foot of iron surface. A water wash solution was then passed through the tower to remove chloride salts and the mass of packing subsequently dried by passage therethrough of a hot, reducing gas (air passed over burning coke).

A crude $TiCl_4$ solution of dark brown color and containing in addition to other impurities, 0.1% of vanadium mostly in the form of vanadyl chloride, was then refluxed and passed through the packed tube. The bottom of the tube was arranged in communication with a boiler into which the crude $TiCl_4$ was charged and the top of the tube was provided with a reflux condenser. The reflux ratio was adjusted to provide adequate contact and reaction of the $TiCl_4$ vapors with the copper plated sheet pieces in the tube. After additional starting, the reflux ratio was adjusted to about 2:1 and the withdrawn $TiCl_4$ vapors, when condensed to liquid, were substantially water-white and by analysis showed less than 0.01% vanadium.

After 3,500 milliliters of crude tetrachloride had been passed through the tube, analysis for vanadium of the $TiCl_4$ being condensed at that time showed 0.012%. The crude $TiCl_4$ feed was discontinued and the tube allowed to drain. The tube containing spent packing, which appeared black, was then washed by flooding by upward displacement with water from the bottom until this wash water appeared clear. The volume employed was approximately the same as that of the original copper plating solution. Reaction of the water on the $TiCl_4$ still retained on the packing surfaces resulted in a hydrolysis reaction to produce a titanium-oxygen compound and a hydrochloric acid solution. The acid solution removed from the iron packing surfaces the complex precipitates formed during the purification reaction, as well as some metallic copper. The wash solution appeared dark purple and opaque containing a substantial quantity of suspended material.

The presence of a small amount of titanous ion in the solution was obtained by reserving a small portion (about 5%) of the supernatant liquor, and adding nitric acid to the remainder. This addition of nitric acid dissolved the metallic copper content of the solution, as well as oxidizing contained titanium compounds, and sufficient acid was added to change the violet color to a blue. Then the reserved portion of the original solution was added until the solution again showed a violet color. The solution was now settled and the supernatant liquor decanted from the solids.

The copper content of the resulting, clarified solution was found to be 4.6 grams per liter and sufficient copper chloride was added to raise this to 5 grams per liter. The pH was at this stage 1.1 and sufficient sodium hydroxide was added to raise the pH to 5.

The adjusted solution was then passed upwardly through the tube containing the iron packing until its copper content was substantially all plated out on the iron surfaces. The tube packing was then washed with water and dried by passing hot flue gas through it in the same manner as the original plating was dried. Crude tetrachloride vapor was then again refluxed and passed through the tube to complete a unit cycle for purification thereof, and the process repeated.

The process of this invention provides an efficient and economical method of purifying crude titanium tetrachloride. The reactivity of the copper-plated iron surfaces employed appears to be superior to that when solid copper pieces are used as the treating agent and this may be due to the fact that they are freshly precipitated by chemical reduction from the plating solution. In addition, recovery of the copper and replating to reconstitute the treating agent provides an integrated, cyclic process with resulting economy in operation.

We claim:

1. In a method for purifying crude titanium tetrachloride by contact with a mass of copper coated ferrous pieces and in which said mass after contact with crude $TiCl_4$ becomes fouled and is retreated for reuse, the improvement in the step of retreating said fouled mass which comprises; draining $TiCl_4$ from said fouled mass, washing said drained mass with a dilute acid wash solution, clarifying and adjusting the used wash solution to provide a soluble copper content therein of between 1 and 20 grams per liter and a pH between 2 and 6, contacting said adjusted used wash solution with said mass to deposite a chemically plated copper surface thereon.

2. In a method for purifying crude titanium tetrachloride by contact with a mass of copper coated ferrous pieces and in which said mass after contact with crude $TiCl_4$ becomes fouled and is retreated for reuse, the improvement in the step of retreating said fouled mass which comprises; draining $TiCl_4$ from said fouled mass, treating said drained mass with water, thereby to form a dilute acid wash solution by hydrolysis reaction of said water with residual $TiCl_4$ in said fouled mass, clarifying and adjusting the used wash solution to provide a soluble copper content therein of between 1 and 20 grams per liter and a pH between 2 and 6, contacting said adjusted used wash solution with said mass to deposit a chemically plated copper surface thereon.

3. In a method for purifying crude titanium tetrachloride by contact with a mass of copper coated ferrous pieces and in which said mass after contact with crude $TiCl_4$ becomes fouled and is retreated for reuse, the improvement in the step of retreating said fouled mass which comprises; washing said fouled mass with a dilute acid wash colution, clarifying the used wash solution, adjusting the clarified solution to provide a soluble copper content therein of between 1 and 20 grams per liter and a pH of between 2 and 6, contacting the washed mass with said adjusted used wash solution thereby to deposit a chemically plated copper surface thereon, washing said mass with water, and drying said mass with a hot, non-oxidizing gas.

4. In a method for purifying crude titanium tetrachloride by contact with a mass of copper coated ferrous pieces and in which said mass after contact with crude $TiCl_4$ becomes fouled and is retreated for reuse, the improvement in the step of retreating said fouled mass which comprises; washing said fouled mass with a dilute acid wash solution, clarifying the used wash solution, adjusting the clarified wash solution by addition of copper chloride thereto to provide a soluble copper content therein of between 1 and 20 grams per liter and adding an alkali thereto to provide a pH of between 2 and 6, contacting the washed mass with said adjusted used wash solution thereby to deposit a chemically plated copper surface thereon, washing said mass with water, and drying said mass with a hot, non-oxidizing gas.

5. In a method for purifying crude titanium tetrachloride by contact with a mass of copper coated ferrous pieces and in which said mass after contact with crude $TiCl_4$ becomes fouled and is retreated for reuse, the improvement in the step of retreating said fouled mass which comprises; draining liquid $TiCl_4$ from said fouled mass, washing said drained mass with a dilute acid wash solution, clarifying the used wash solution, adjusting the clarified solution to provide a soluble copper content therein of between 1 and 20 grams per liter and a pH of between 2 and 6, contacting the washed mass with said adjusted used wash solution thereby to deposit a chemically plated copper surface thereon, washing said mass with water, and drying said mass with a hot, non-oxidizing gas.

6. In a method for purifying crude titanium tetrachloride by contact with a mass of copper coated ferrous pieces and in which said mass after contact with crude TiCl$_4$ becomes fouled and is retreated for reuse, the improvement in the step of retreating said fouled mass which comprises; treating said fouled mass with water, thereby to form a dilute hydrochloric acid wash solution by hydrolysis reaction of said water with residual TiCl$_4$ in said mass, clarifying the used wash solution, adjusting the clarified solution to provide a soluble copper content therein of between 1 and 20 grams per liter and a pH of between 2 and 6, contacting the washed mass with said adjusted used wash solution thereby to deposit a plated copper surface thereon, washing said mass with water, and drying said mass with a hot, non-oxidizing gas.

7. In a method for purifying crude titanium tetrachloride by contact with a mass of copper coated ferrous pieces and in which said mass after contact with crude TiCl$_4$ becomes fouled and is retreated for reuse, the improvement in the step of retreating said fouled mass which comprises; washing said fouled mass with a dilute acid wash solution, separating and reserving a small portion of the used wash solution, oxidizing the remainder of the used wash solution with nitric acid thereby to oxidize and dissolve metallic copper present in said solution, gradually adding back the reserved portion of said solution until the violet color which indicates the presence of lower chlorides of titanium appears, clarifying said solution, adjusting the clarified solution to provide a soluble copper content therein of between 1 and 20 grams per liter and a pH of between 2 and 6, contacting the washed mass with said adjusted used wash solution thereby to deposit a chemically plated copper surface thereon, washing said mass with water, and drying said mass with a hot, non-oxidizing gas.

References Cited in the file of this patent

UNITED STATES PATENTS

| | | |
|---|---|---|
| 282,754 | Morton | Aug. 7, 1883 |
| 2,139,604 | Raney | Dec. 6, 1938 |
| 2,416,191 | Meister | Feb. 18, 1947 |
| 2,725,350 | Levy | Nov. 29, 1955 |